[46.]

S. C. Boughton. Driving Bit.

No. 118,900.  Patented Sep. 12, 1871.

Witnesses:
A. W. Almquist
Wm. H. C. Smith

Inventor:
S. C. Boughton
PER
Attorneys.

UNITED STATES PATENT OFFICE.

SMITH C. BOUGHTON, OF WATERFORD, NEW YORK.

IMPROVEMENT IN BRIDLE-BITS.

Specification forming part of Letters Patent No. 118,900, dated September 12, 1871.

*To all whom it may concern:*

Be it known that I, SMITH C. BOUGHTON, of Waterford, in the county of Saratoga and State of New York, have invented a new and useful Improvement in Driving-Bit; and I do hereby declare that the following is a full, clear, and exact description thereof, which will enable others skilled in the art to make and use the same, reference being had to the accompanying drawing forming part of this specification, in which—

Figure 1:
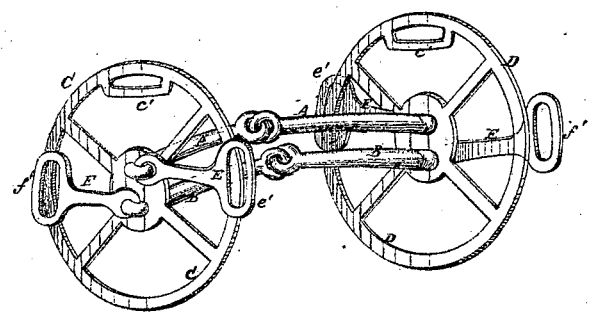
Figure 2:
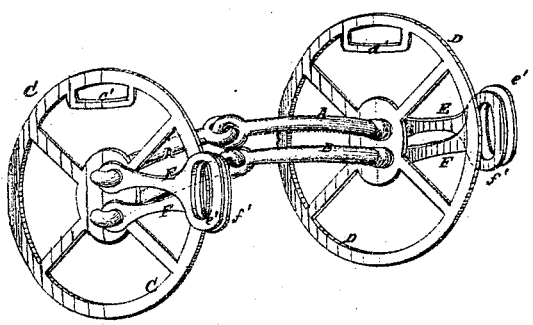

Figure 1 is a perspective view of my improved driving-bit, illustrating one adjustment. Fig. 2 is a perspective view of the same, illustrating another adjustment.

Similar letters of reference indicate corresponding parts.

My invention has for its object to furnish an improved driving-bit, which shall be so constructed that it may be differently adjusted to meet the different faults of the animals to be driven, bringing the animal in every case completely under the control of the driver; and it consists in the construction and combination of the different parts of the bit as hereinafter more fully described.

A B are two bits, which may be jointed with a single or double joint, as may be desired, or which may be curved-bar bits. The bits A B pass through two holes in the middle parts of the two cheek-pieces C D, so as to be entirely independent of each other. The cheek-pieces C D are provided with loops $c'$ $d'$ in their upper parts, to receive the headstall-straps. The cheek-pieces C D are made with openings to make them neater and lighter, and to furnish places for the attachment of the nose-strap and check-rein, either or both, when used. To the outer ends of the bits A B are pivoted the inner ends of the bars E F, upon the outer ends of which are formed loops $e'$ $f'$. The loops $e'$ $f'$ are so formed that the two loops upon each side may be placed together to receive the same rein, as shown in Fig. 2. The bars E F are made of such a length that when the driving-rein is attached to one of the loops $e'$ $f'$ the other loop may be turned forward and fastened to the rim of the cheek-piece by the nose-strap or turned upward and fastened to said rein by the check-rein; or both loops may be turned back, and the driving-rein passed around the rim and through both loops. For a hard puller the driving-reins are attached to the alternate loops $e'$ $f'$, and the other alternate loops are turned forward and fastened with the nose-strap to the rim of the cheek-pieces; or, when the nose-strap is not used, turned upward and fastened to said rim with the check-rein.

By this arrangement, by pulling upon the driving-reins the cheek-pieces are forced against the horses' mouths, and the nose-band acting as a fulcrum the bits are thrown to the roof of the animal's mouth with great force, which, together with the side pressure of the cheek-pieces, causes him to yield at once. With this arrangement, when the nose-strap is not used the bits press upon the animal's lower lips, which, with the side pressure of the cheek-pieces, forces the animal's mouth open, loosening his hold upon the bits. With the arrangement shown in Fig. 2, pulling upon the driving-reins forces the cheek-pieces against the sides of the animal's mouth and the bits against the roof of his mouth, but not with the same force as when the arrangement shown in Fig. 1 is used. The arrangement shown in Fig. 2, without the nose-strap, will not compress the sides of the mouth, and may be used for ordinary driving. For a tender-mouthed animal the arrangement shown in Fig. 2 is used, but the driving-reins are buckled around the rim of the cheek-pieces, and through the loops, and the nose-strap so adjusted as not to allow the bits to press with much force against the animal's lower lip when the reins are pulled upon, thus applying the pressure to the nose and relieving the tender mouth. Various other arrangements of the bits may be made, to meet special faults of the animal to be driven.

Having thus described my invention, I claim as new and desire to secure by Letters Patent—

1. The combination of the two jointed bits A B with the loose or sliding cheek-pieces C D, substantially as herein shown and described.

2. The combination of the pivoted looped bars E $e'$ F $f'$ with the two bits A B and sliding cheek-pieces C D, substantially as herein shown and described.

The above specification of my invention signed by me this 30th day of March, 1871.

SMITH C. BOUGHTON.

Witnesses:
JAMES T. GRAHAM,
ALEX. F. ROBERTS.